(12) United States Patent
Doersam et al.

(10) Patent No.: US 11,052,843 B2
(45) Date of Patent: Jul. 6, 2021

(54) BATTERY ARRANGEMENT FOR A MOTOR VEHICLE

(71) Applicant: Daimler AG, Stuttgart (DE)

(72) Inventors: Thomas Doersam, Stuttgart (DE); Andreas Eichinger, Ammerbuch (DE); Rainer Falsett, Babenhausen (DE); Heiko Hachtel, Schwieberdingen (DE); Frieder Herb, Kirchheim (DE); Oliver Lehmann, Leonberg (DE); Christian Ohms, Ehningen (DE)

(73) Assignee: Daimler AG, Stuttgart (DE)

( * ) Notice: Subject to any disclaimer, the term of this patent is extended or adjusted under 35 U.S.C. 154(b) by 109 days.

(21) Appl. No.: 16/314,842

(22) PCT Filed: Jun. 28, 2017

(86) PCT No.: PCT/EP2017/000765
§ 371 (c)(1),
(2) Date: Jan. 2, 2019

(87) PCT Pub. No.: WO2018/006996
PCT Pub. Date: Jan. 11, 2018

(65) Prior Publication Data
US 2019/0255967 A1    Aug. 22, 2019

(30) Foreign Application Priority Data
Jul. 8, 2016   (DE) ............... 10 2016 008 263.1

(51) Int. Cl.
*B60R 16/033*    (2006.01)
*H02J 7/00*    (2006.01)
(Continued)

(52) U.S. Cl.
CPC .............. *B60R 16/033* (2013.01); *B60K 6/28* (2013.01); *B60L 15/2045* (2013.01);
(Continued)

(58) Field of Classification Search
CPC ....... B60L 58/19; H02J 7/0024; B60R 16/033
See application file for complete search history.

(56) References Cited

U.S. PATENT DOCUMENTS 6,140,799 A * 10/2000 Thomasson ........... H02J 7/0024
    320/117
8,330,419 B2 * 12/2012 Kim .................. H01M 10/4257
    320/121

(Continued)

FOREIGN PATENT DOCUMENTS

DE    10 2015 006 208 A1    12/2015
EP         2 897 247 A1     7/2015
(Continued)

OTHER PUBLICATIONS

PCT/EP2017/000765, International Search Report dated Oct. 10, 2017 (Three (3) pages).

*Primary Examiner* — Richard V Muralidar
(74) *Attorney, Agent, or Firm* — Crowell & Moring LLP

(57) ABSTRACT

A battery arrangement for a motor vehicle includes a first electrical energy store, a second electrical energy store, a charging connection, and a supply connection. The arrangement further includes first through seventh switches. The battery arrangement is switchable into four operating states via respective opening and closing of the first through seventh switches.

5 Claims, 1 Drawing Sheet

(51) Int. Cl.
  *B60L 50/60*   (2019.01)
  *B60L 58/19*   (2019.01)
  *B60K 6/28*    (2007.10)
  *B60L 15/20*   (2006.01)
  *H01M 10/44*   (2006.01)
  *B60L 58/21*   (2019.01)
  *B60L 58/20*   (2019.01)
  *B60R 16/03*   (2006.01)

(52) U.S. Cl.
  CPC ............... *B60L 50/60* (2019.02); *B60L 50/66* (2019.02); *B60L 58/19* (2019.02); *B60L 58/20* (2019.02); *B60L 58/21* (2019.02); *H01M 10/441* (2013.01); *H02J 7/0024* (2013.01); *B60R 16/03* (2013.01); *B60Y 2200/91* (2013.01); *B60Y 2200/92* (2013.01); *Y02T 10/64* (2013.01); *Y02T 10/70* (2013.01); *Y02T 10/72* (2013.01)

(56) References Cited

U.S. PATENT DOCUMENTS

| | | | |
|---|---|---|---|
| 9,966,780 B2* | 5/2018 | Sherstyuk | H01M 10/44 |
| 10,069,313 B2* | 9/2018 | Tkachenko | H01M 10/441 |
| 10,800,286 B2* | 10/2020 | Doersam | B60L 58/20 |
| 2010/0261043 A1* | 10/2010 | Kim | H01M 10/4207 |
| | | | 429/61 |
| 2011/0001442 A1* | 1/2011 | Lee | B62M 6/45 |
| | | | 318/139 |
| 2012/0256568 A1 | 11/2012 | Lee | |

FOREIGN PATENT DOCUMENTS

| JP | 2010-178421 A | 8/2010 |
|---|---|---|
| JP | 2012-70492 A | 4/2012 |

\* cited by examiner

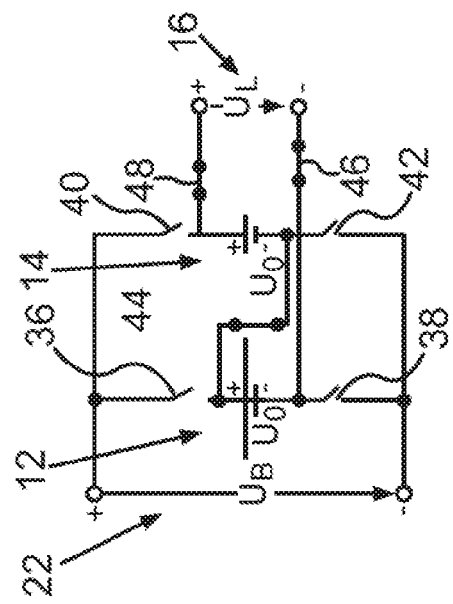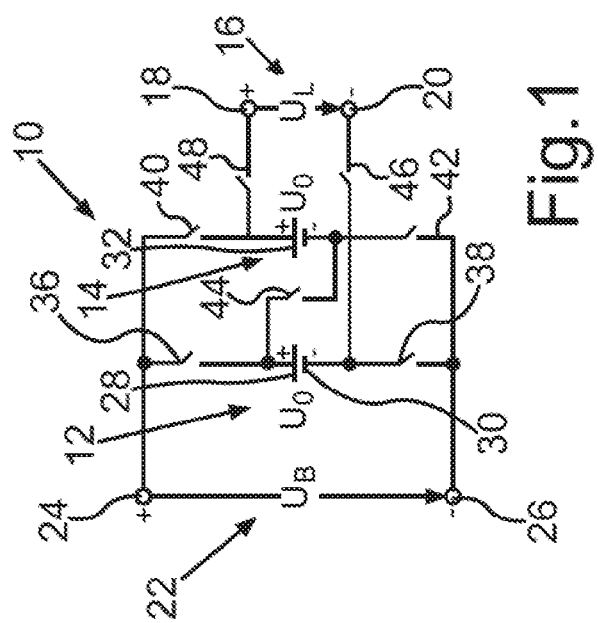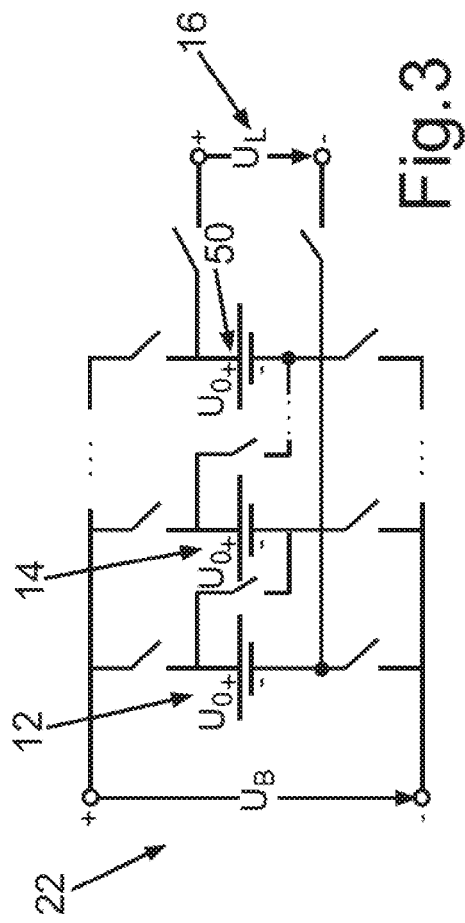

BATTERY ARRANGEMENT FOR A MOTOR VEHICLE

BACKGROUND AND SUMMARY OF THE INVENTION

The present invention refers to a battery arrangement for a motor vehicle, in particular for a passenger car.

In the present case, the interest is directed in particular to battery arrangements which are used, for example, in electric vehicles or in hybrid vehicles. These battery arrangements comprise a plurality of electrical energy stores, which together can provide a so-called high-voltage battery. The high-voltage batteries usually have a charging connection, by means of which the high-voltage batteries can be charged. Furthermore, the high-voltage batteries usually have a supply connection, to which in particular the electrical loads, in particular of the electric motor vehicle (for example, the electric motor) may be connected.

The electrical energy store or the high-voltage batteries of such a battery arrangement are usually designed for fixed voltage levels. In hybrid vehicles, for example, such a voltage level is about 150 volts. For electrical energy stores used in electric vehicles or in a plug-in hybrid, such voltage may be, for example, about 400 volts. In the case of electric buses or trucks, such voltage usually is in a range of 800 volts. The currently known electrical energy stores or high-voltage batteries are not designed for all voltage levels and therefore cannot be used in different vehicles.

DE 10 2015 006 208 A1 discloses a battery arrangement for a motor vehicle with an electrical separating device and a method for operating such a battery arrangement. To this end, the battery arrangement for a motor vehicle has a first electrical energy store and a second electrical energy store. Furthermore, the battery arrangement comprises a charging connection and a supply connection as well as an electrical separation device. The separation device is designed to electrically connect the first and the second electrical energy store to the charging connection and/or the supply connection. Furthermore, the electrical separation device is designed to electrically connect the first and the second electrical energy store in a charging configuration for charging the first and the second electrical energy store by means of a charging station via the charging connection and to supply an electrical load of the motor vehicle by means of the first and the second electrical energy store via the supply connection to electrically connect the first and the second electrical energy store in an operating configuration. However, the invention presented in this document is only a theoretical invention, since, for example, a technically feasible solution cannot be provided, according to the current state of the art, due to the lack of high-voltage changeover switches.

The object of the present invention is to develop a battery arrangement of above the type in such a way that such a battery arrangement may be provided in accordance with the provisions for high-voltage safety and in consideration of the feasibility of the components.

In order to develop a battery arrangement for a motor vehicle in such a way that such a battery arrangement may be provided in accordance with the provisions for high-voltage safety and in consideration of the feasibility of the components, according to the invention, the battery arrangement has a second switch which connects a negative pole of the first electrical energy store to the negative pole of the supply connection. Moreover, according to the invention, the battery arrangement has a sixth switch which connects the negative pole of the first electrical energy store to the negative pole of the charging connection. The battery arrangement also has a seventh switch, which connects the positive pole of the second electrical energy store to the positive pole of the charging connection. By means of this embodiment, a multiplicity of possible operating conditions is rendered possible. Moreover, the requirement of high-voltage safety may be fulfilled, since a potential separation of the voltage levels may be provided. The switches may for example be provided as high-voltage protection, wherein they may be integrated in the wiring system, thus reducing the number of components in the high-voltage driving system to a minimum. In this inventive embodiment, both the high-voltage safety and the feasibility of the individual components are provided, so that the battery arrangement may be easily provided to a motor vehicle. In particular, in order to further reduce the number of components, a control for the switches, in particular for the high-voltage protection, may be integrated in the battery arrangement.

In an advantageous embodiment, a first operating state may be switched when closing the fifth, the sixth and the seventh switch. The first electrical and the at least one second electrical energy store are thus rechargeable with a charging voltage $U_L$, which may be in particular twice as high as an operating voltage of the first and/or the second electrical energy store. When the fifth, sixth and seventh switches are closed, the first energy store and the at least second energy store are connected in series. In the series circuit thus the first and the second energy store can be charged with a double voltage. Thus:

$$U_L = 2 \times U_O$$

wherein $U_O$ corresponds to the voltage of the first and the at least one second energy store. By means of the higher electrical voltage during charging, the charging power can be increased without the need to increase the charging current. Furthermore, the wiring with thicker and more expensive cables within the battery arrangement may be omitted, or the individual components of the battery arrangement have not to be designed for higher electrical currents. These electrical components may be, for example, one of the contacts, the electrical separation device, cell connectors, electronics or a battery management system. Furthermore, a lower voltage infrastructure can be provided in the motor vehicle itself, which can lead to cost savings. By charging in particular the first and the at least one second energy store with twice the voltage, a shorter charging time can be made possible, and at the same time a more favorable voltage infrastructure may be provided in the motor vehicle itself, in particular for the electric loads.

According to an advantageous embodiment, a second operating state can be switched when closing the first, the second, the third and the fourth switch. In this embodiment, the motor vehicle is in particular in a driving state, in which by means of the first and the at least second energy store, the voltage can be made available in particular for driving. Electrical components, in particular electrical loads, which may be, for example, an electric drive unit of the motor vehicle, may thus be operated. In particular, the operating voltage $U_B$ may be the voltage of an electric motor, for example, which is generated in order to drive the electric motor. In this embodiment, the first and the at least one second energy store are in a parallel connected state. Thus, $U_B = U_O$. Thus, by means of the parallel connection, a higher energy density may be provided at the same voltage, in particular a higher current for the electrical components of the motor vehicle.

According to a further advantageous embodiment, a third operating state can be switched when closing the first, the second, the third, the fourth, the sixth and the seventh switch. The first and the at least one second electrical energy store can be charged, for example, with a simple charging voltage $U_L$. Thus:

$$U_B = U_L = U_0$$

In this configuration, the first electrical energy store and at least the second electrical energy store are connected in parallel and the charging connection and the supply connection are also connected in parallel. Thus, the first energy store and the at least one second energy store can be charged via the charging connection with the same charging voltage, while at the same time, for example, the same voltage can be provided at the supply connection. Thus, for example, in a 400-volt infrastructure of the motor vehicle and, for example, in a 400-volt infrastructure of the charging connection, the first and the at least one second energy store can be charged accordingly.

According to a further advantageous embodiment, a fourth operating state can be switched when opening the first, the second, the third, the fourth, the sixth, the seventh and/or the fifth switch. This fourth operating state realizes an all-pole potential separation. By means of this embodiment, all components of the battery arrangement are separable from each other and thus the high-voltage safety can be ensured. Thus, voltage freedom is provided for all poles.

Further advantages, features and details of the invention will become apparent from the following description of a preferred embodiment and from the drawings. The features and feature combinations mentioned above in the description as well as the features and feature combinations mentioned below in the description of the figures and/or separately shown in the figures may be used not only in the respectively indicated combination but also in other combinations or in a stand-alone manner, without departing from the scope of the invention.

The invention will now be described with reference to preferred embodiments and with reference to the accompanying drawings.

BRIEF DESCRIPTION OF THE DRAWINGS

FIG. 1 shows a battery arrangement for a motor vehicle according to an inventive embodiment;

FIG. 2 shows the battery arrangement according to FIG. 1 in a further operating state according to an embodiment of the invention; and FIG. 3 shows a battery arrangement with a plurality of electrical energy stores according to an embodiment of the invention.

DETAILED DESCRIPTION OF THE DRAWINGS

In the figures, the same elements and functionally identical elements are provided with the same reference numerals.

FIG. 1 shows a battery arrangement 10 for a motor vehicle, which is not shown in FIG. 1, in a schematic representation. The battery arrangement 10 may be used, for example, in an electric vehicle, a plug-in hybrid or a hybrid vehicle. The motor vehicle can be designed in particular as a passenger vehicle, a bus or a truck.

The battery arrangement 10 furthermore comprises a first energy store 12 and at least one second energy store 14. The first energy store 12 and the second energy store 14 may together form, in particular, a high-voltage battery. Further, the battery arrangement 10 includes a charging connection 16 having a positive pole 18 of the charging connection 16 and a negative pole 20 of the charging connection 16. Further, the battery arrangement 10 includes a supply connection 22 having a positive pole 24 of the supply connection 22 and a negative pole 26 of the supply connection. The first energy store 12 also has a positive pole 28 of the first energy store 12 and a negative pole 30 of the first energy store. The second energy store 14 likewise has a positive pole 32 of the second energy store 14 and a negative pole 34 of the second energy store 14.

In particular, a charging voltage $U_L$ can be supplied to the charging connection 16. The first energy store 12 and the second energy store 14 can be operated with a voltage $U_0$. Furthermore, the voltage $U_B$ may be present in particular at the supply connection 22.

Furthermore, the battery arrangement 10 has a first switch 36 which connects the positive pole 28 of the first energy store 12 to the positive pole 24 of the supply connection 22. A second switch 38 connects the negative pole 30 of the first energy store 12 to the negative pole 26 of the supply connection 22. A third switch 40 connects the positive pole 32 of the second energy store 14 to the positive pole 24 of the supply connection 22. A fourth switch 42 connects the negative pole 34 of the second energy store 14 to the negative pole 26 of the supply connection 22. A fifth switch 44 connects the positive pole 28 of the first energy store 12 to the negative pole 34 of the second energy store 14. A sixth switch 46 connects the negative pole 30 of the first energy store 12 to the negative pole 20 of the charging connection 16. And a seventh switch 48 connects the positive pole 32 of the second energy store 14 to the positive pole 18 of the charging connection 16.

The switches 36, 38, 40, 42, 44, 46, 48 may in particular be high-voltage protections.

In particular, the first electrical energy store 12 and the second electrical energy store 14 can be charged via the charging connection 16 by means of a charging station external to the motor vehicle. In particular, an electrical load of the motor vehicle can be connected to the supply connection 22, in particular, the electrical load can be an electric drive motor of the motor vehicle. Thus, the electrical load can be supplied with electrical energy via the supply connection 22 by the first electrical energy store 12 and/or the second electrical energy store 14. FIG. 1 shows the switches 36, 38, 40, 42, 44, 46, 48 in an open state. Therefore, in particular, all-pole absence of voltage may be provided, which, in particular, provides the safety for the high-voltage network, in particular according to the requirements of certain high-voltage standards. This connection may in particular correspond to a fourth operating state of the battery arrangement 10.

The first switch 36, the second switch 38, the third switch 40 and the fourth switch 42 may in particular ensure a potential separation in the direction of a supply voltage $U_B$. The sixth switch 46 and the seventh switch 48 can in particular ensure the potential separation in the direction of the charging voltage $U_L$. The sixth switch 46 and the seventh switch 48 can act in particular as charging contactors. The fifth switch 44 allows a series connection of the first energy store 12 and the second energy store 14. Since the fifth switch 44 is not responsible for a potential separation, the fifth switch 44 can also be designed as a semiconductor component (diode, transistor, etc.), for example.

FIG. 2 shows the battery arrangement 10 according to an inventive embodiment, in particular in a first operating state of the battery arrangement. In FIG. 2, the sixth switch 46 and the seventh switch 48 are closed. Furthermore, the fifth switch 44 is closed. The first switch 36, the second switch 38, the third switch 40, and the fourth switch 42 are in an open state. Thus, the first energy store 12 and the second energy store 14 are connected in series. At the charging connection 16 the charging voltage $U_L$ may be applied, for charging the first electrical energy store 12 and the second electrical energy store 14. This charging voltage $U_L$ can in particular be twice as large as the voltage $U_0$ of the first electrical energy store 12 and of the second electrical energy store 14. For example, the charging voltage $U_L$ may be 800 volts. The voltage of the first electrical energy store 12 and/or the second electrical energy store 14 may in particular be equal to 400 volts. Thus, for charging the electrical energy store 12, 14, the charging voltage $U_L$ may be used, which is greater than the voltage $U_0$ or even greater than the supply voltage $U_B$. Due to the higher charging voltage $U_L$, a higher charging power can be achieved when charging the electrical energy stores 12, 14. In addition, shorter loading times can be made possible. Furthermore, for example, a 400-volt infrastructure may be still used for the battery arrangement.

FIG. 3 shows the battery arrangement 10 in a further embodiment. In this case, the battery arrangement 10 comprises a plurality of electrical energy stores 12, 14, 50. In the present case, only the first electrical energy store 12, the second electrical energy store 14 and a last electrical energy store 50 are shown for the sake of clarity. By means of this embodiment, it is possible to provide a plurality of electrical energy stores 12, 14, 50, and thus to ensure a higher energy density, in particular for the operation of the loads in the motor vehicle.

LIST OF REFERENCE CHARACTERS 10 battery arrangement
12 first energy store
14 second energy store
16 charging connection
18 positive pole
20 negative pole
22 supply connection
24 positive pole
26 negative pole
28 positive pole
30 negative pole
32 positive pole
34 negative pole
36 first switch
38 second switch
40 third switch
42 fourth switch
44 fifth switch
46 sixth switch
48 seventh switch
50 last energy store

The invention claimed is:

1. A battery arrangement for a motor vehicle, comprising:
a first electrical energy store;
a second electrical energy store;
a charging connection with a positive pole and a negative pole;
a supply connection with a positive pole and a negative pole;
a first switch that connects a positive pole of the first electrical energy store to the positive pole of the supply connection;
a second switch that connects a negative pole of the first electrical energy store to the negative pole of the supply connection;
a third switch that connects a positive pole of the second electrical energy store to the positive pole of the supply connection;
a fourth switch that connects a negative pole of the second electrical energy store to the negative pole of the supply connection;
a fifth switch that connects the positive pole of the first electrical energy store to the negative pole of the second electrical energy store;
a sixth switch that connects the negative pole of the first electrical energy store to the negative pole of the charging connection; and
a seventh switch that connects the positive pole of the second electrical energy store to the positive pole of the charging connection.

2. The battery arrangement according to claim 1, wherein the battery arrangement is switchable into a first operating state when the fifth switch, the sixth switch, and the seventh switch are closed.

3. The battery arrangement according to claim 2, wherein the battery arrangement is switchable into a second operating state when the first switch, the second switch, the third switch, and the fourth switch are closed.

4. The battery arrangement according to claim 3, wherein the battery arrangement is switchable into a third operating state when the first switch, the second switch, the third switch, the fourth switch, the sixth switch, and the seventh switch are closed.

5. The battery arrangement according to claim 4, wherein the battery arrangement is switchable into a fourth operating state when the first switch, the second switch, the third switch, the fourth switch, the sixth switch, the seventh switch, and/or the fifth switch are opened.

* * * * *